United States Patent
Woodruff

(10) Patent No.: US 6,293,438 B1
(45) Date of Patent: Sep. 25, 2001

(54) METHODS AND APPARATUS FOR METERING MATERIAL

(75) Inventor: Keith F. Woodruff, Mountainside, NJ (US)

(73) Assignee: American Cyanamid Company, Madison, NJ (US)

(*) Notice: Subject to any disclaimer, the term of this patent is extended or adjusted under 35 U.S.C. 154(b) by 0 days.

(21) Appl. No.: 09/363,634

(22) Filed: Jul. 29, 1999

Related U.S. Application Data

(60) Provisional application No. 60/097,496, filed on Aug. 21, 1998.

(51) Int. Cl.[7] .................................................. G01F 11/10
(52) U.S. Cl. .................................................. 222/342
(58) Field of Search .................................. 222/342, 228, 222/292, 616; 239/656, 665

(56) References Cited

U.S. PATENT DOCUMENTS

| | | |
|---|---|---|
| 460,120 | 9/1891 | Eberhart . |
| 835,040 | 11/1906 | Synder . |
| 873,497 | 12/1907 | Buell . |
| 1,956,560 | 5/1934 | Carpenter . |
| 2,164,333 | 7/1939 | Mann .................................. 221/141 |
| 2,366,644 | 1/1945 | Nyden . |
| 2,489,171 | 11/1949 | Balduf . |
| 2,572,060 | 10/1951 | Schwabenlender . |
| 2,974,963 | 3/1961 | McBride . |
| 3,082,007 | 3/1963 | Johnson . |
| 3,586,246 | 6/1971 | Van DerLely . |
| 3,602,394 | 8/1971 | McCune . |
| 4,032,074 | 6/1977 | Amerine . |
| 4,283,014 | 8/1981 | Devorak . |
| 4,500,017 | 2/1985 | Machnee .............................. 222/288 |
| 4,548,362 | 10/1985 | Doering . |
| 4,597,531 | 7/1986 | Kise . |
| 4,609,153 | 9/1986 | Van DerLely . |
| 4,785,976 | 11/1988 | Bennie et al. . |
| 4,867,381 | 9/1989 | Speicher . |
| 5,009,344 | 4/1991 | Cooley . |
| 5,029,624 | 7/1991 | McCunn et al. . |
| 5,058,766 | 10/1991 | Deckler ................................ 221/254 |
| 5,060,701 | 10/1991 | McCunn et al. . |
| 5,145,116 | 9/1992 | Shaver . |
| 5,170,909 | 12/1992 | Lundie et al. . |
| 5,287,999 | 2/1994 | Olsen .................................... 222/616 |
| 5,288,017 | 2/1994 | Halovitz . |
| 5,294,060 | 3/1994 | Thompson . |
| 5,638,988 | 6/1997 | Rogers et al. . |
| 5,641,011 | 6/1997 | Benedetti, Jr. et al. . |
| 5,845,687 | 12/1998 | Woodruff . |

FOREIGN PATENT DOCUMENTS

| | | | |
|---|---|---|---|
| 541921 | 5/1993 | (EP) | ................................ A01C/7/12 |

*Primary Examiner*—Philippe Derakshani
*Assistant Examiner*—Thach H Bui
(74) *Attorney, Agent, or Firm*—Charles F. Costello

(57) ABSTRACT

Methods and apparatus are provided for dispensing materials, and in particular, granular chemical agricultural material, from a moving device driven over terrain to be treated with the material. The device has a metering system for dispensing the material including a rotatable apertured disk for metering material from a product container and dispensing the material in controlled metered quantities. The metering disk is removable from its operating position within the dispensing device for inspection, repair or replacement purposes, without disassembling the overall apparatus, and a guide is provided for returning the metering disk to its operating position within the dispensing device. The apertures in the metering disk are oriented so that each aperture partially overlaps each adjacent aperture to result in continuous flow of the metered material through the metering disk as it rotates.

20 Claims, 5 Drawing Sheets

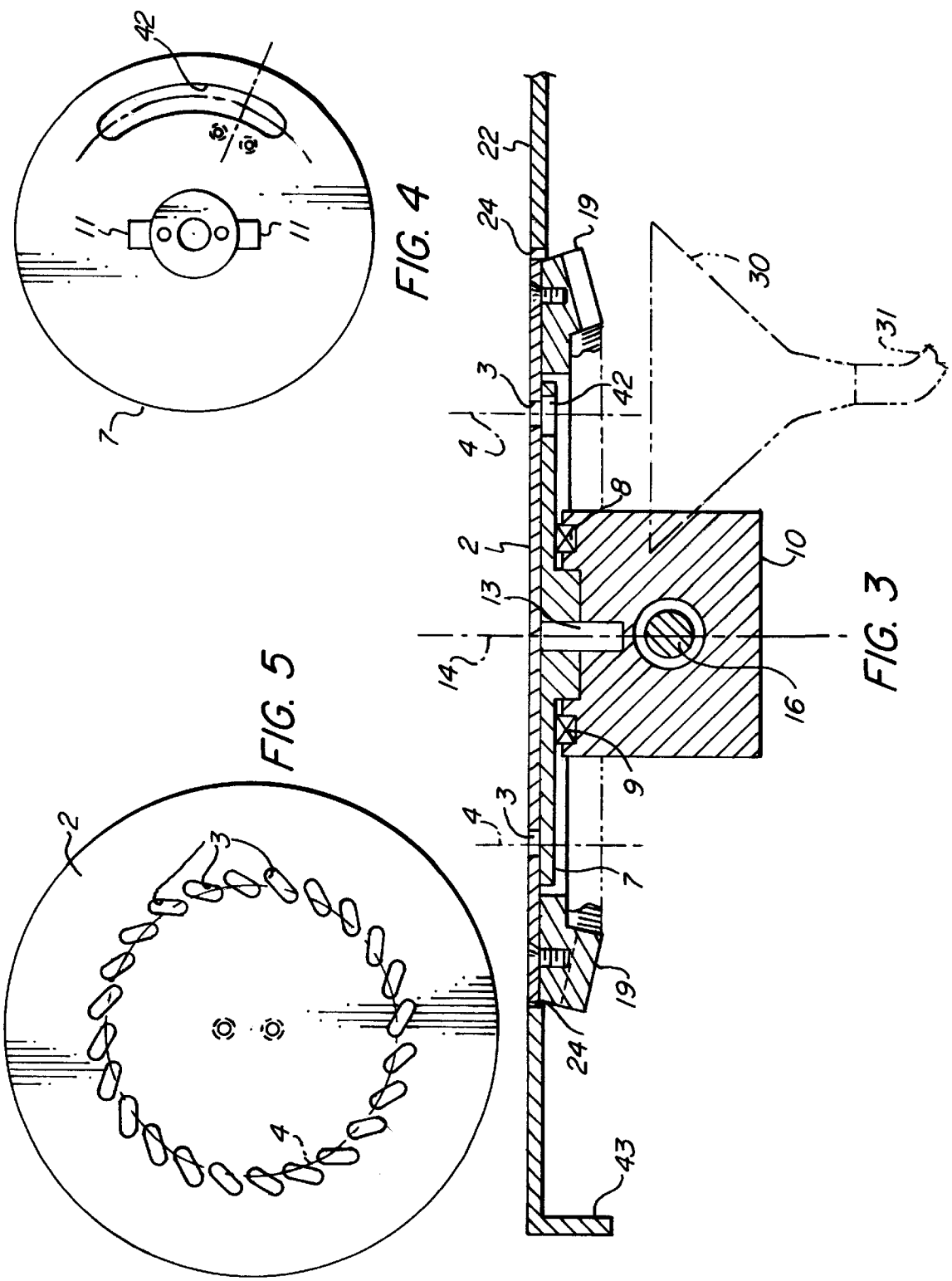

METHODS AND APPARATUS FOR METERING MATERIAL

This application claims benefit of Provisdional No. 60/097,496 filed Aug. 21, 1998.

BACKGROUND OF THE INVENTION

The present invention is directed to methods and apparatus for dispensing material, particularly granular chemical material. The invention is particularly adapted for dispensing agricultural material, such as pesticides, herbicides, and fungicides from an apparatus driven over terrain onto which the treatment material is applied.

Agricultural dispensing apparatus, more commonly known as granular or broadcast spreaders, generally include a wheeled vehicle, either self powered (e.g., motorized) or manually driven, including a housing having a hopper for receiving a container holding product to be dispensed, and metering means for controlling the quantity of material flowing from the product container, by gravity feed, on to dispensing means, such as a spinning plate positioned beneath the metering means for receiving material deposited thereon and dispensing material therefrom by rotational forces. The apparatus is driven along the terrain to be treated, and the material to be applied to the terrain is dispensed from the moving apparatus. Known apparatus are exemplifed by the following United States patents: U.S. Pat. Nos. 460,120; 835,040; 873,497; 1,956,560; 2,366,644; 2,489,171; 2,572,060; 2,974,963; 3,082,007; 3,586,246; 3,602,394; 4,032,074; 4,283,014; 4,548,362; 4,597,531; 4,609,153; 4,785,976; 4,867,381; 5,009,344; 5,029,624; 5,060,701; 5,145,116; 5,288,017; 5,294,060; 5,638,988; and 5,641,011.

The disclosure of U.S. Pat. No. 5,029,624, issued on Jul. 9, 1991 and entitled "Closed Granular Chemical Handling System" which discloses a known dispensing system for granular material, is expressly incorporated by reference herein. The disclosure of Australian Patent Application No. 16519/97, published September–October 1997, which discloses a valve system particularly for use with agricultural equipment, is also expressly incorporated by reference herein.

Granular agricultural dispensers generally include metering systems having a rotatable apertured metering disk disposed between a product container and means for discharging product from the dispensing apparatus. Removal of the metering disk from the apparatus is required for several different purposes including inspection, maintenance, repair, and replacement. Moreover, different metering disks can be interchangeably mounted in the dispensing apparatus to adjust the pattern of flow of product through the rotatable metering disk, the quantity of product flowing through the metering disk, or the rate at which product flows through the metering disk. In the known dispensing devices, it is necessary to substantially disassemble the entire apparatus to remove the metering disk from the meter assembly.

It is the primary object of the present invention to provide means for readily removing the metering disk of a dispensing apparatus without disassembling the apparatus. It is a further object of the present invention to provide guide means by which the metering disk can be readily returned to its proper operating position within the dispensing apparatus.

Other objects, improvements and advantages of the present invention will be apparent from the following discussion herein.

SUMMARY OF THE INVENTION

The present invention provides methods and apparatus for dispensing material, and in particular granular agricultural treatment material, from a movable dispensing apparatus. The apparatus includes container means for holding a supply of material to be dispensed from the apparatus, and a metering system for controlling the quantity, rate and pattern at which material is dispensed from the apparatus. The metering system includes a rotatable apertured disk positioned relative to the container means such that material from the container means flows through the metering disk before the material is discharged from the dispensing apparatus. Means are provided for removing the metering disk from the meter assembly of the dispensing apparatus, for example, to inspect, maintain, repair or replace the metering disk, without disassembling the apparatus. Preferably, the means for removing the disk includes a slideable element such as a tray for carrying the metering disk and means for removably mounting the disk to the tray so that the metering disk is selectively removable from the dispensing apparatus by sliding the tray out from the apparatus to displace the tray for providing access to the metering disk without disassembling the apparatus. The metering disk can then be removed from the slideable tray and the same or another metering disk can be placed back on the slideable tray. Guide and alignment means are provided to assure that the slideable tray carrying the metering disk is returned to its proper operating position within the dispensing apparatus. Preferably the guide and alignment means includes cooperating collars, stop means and channel brackets operatively associated with the slideable tray to assure that the metering disk is in its proper operating position when the tray is slid into its maximum retracted position within the dispensing apparatus.

The slideable tray carrying the removable metering disk is arranged and oriented relative to the overall dispensing apparatus so that a portion of the tray covers the discharge outlet of the product container of the dispensing apparatus when the tray is slid out from the apparatus. In this manner, when the metering disk is displaced from its operating position by sliding the tray, material cannot flow from the product container because the discharge outlet remains blocked by a portion of the slideable tray.

In a further aspect of the present invention, the openings defined in the rotatable metering disk are oriented such that each opening partially overlaps each adjacent opening. In this manner, flow of product through the rotating metering disk is continuous, and not intermittent, as a result of the arrangement of the successive overlapping adjacent openings.

BRIEF DESCRIPTION OF THE DRAWINGS

FIG. 3 is a side elevational view of a portion of the dispensing apparatus in accordance with the present invention showing the orientation of a slideable tray carring a metering disk relative to a support block;

FIG. 4 is a bottom plan view of a thrust plate of a metering system in accordance with the present invention;

FIG. 5 is a top plan view of a metering disk in accordance with the present invention;

DESCRIPTION OF THE BEST MODES FOR CARRYING OUT THE INVENTION

Figure 1:
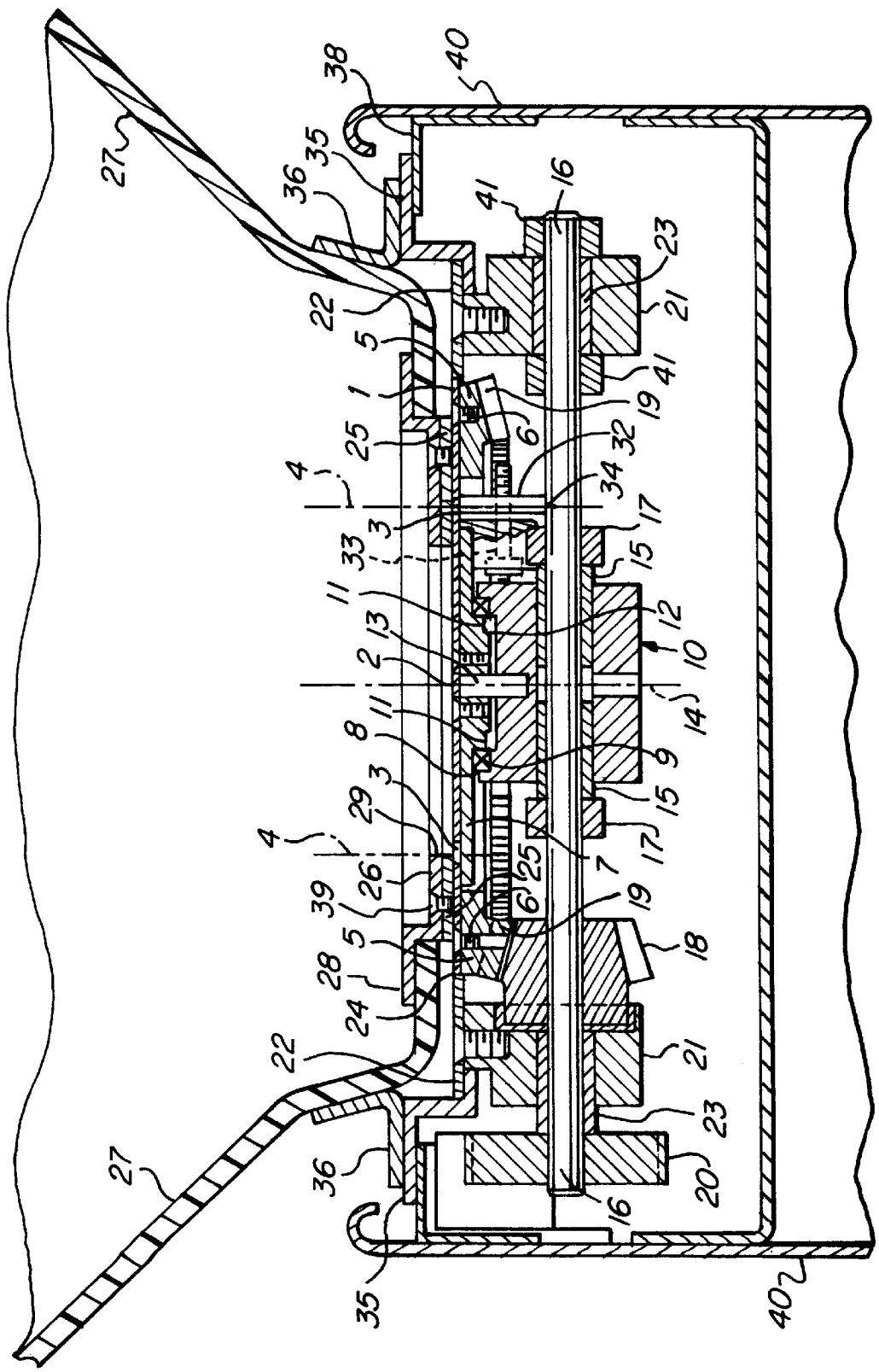
FIG. 1 a side elevational view, in section, illustrating a portion of a spreader apparatus including a metering system in accordance with the present invention.
Figure 1A:
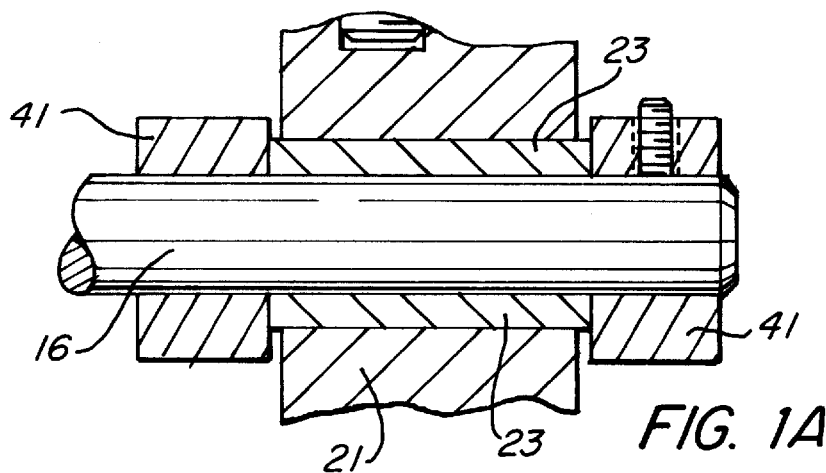
FIGS. 1A and 1B illustrate portions of FIG. 1 in greater detail.

The spreader apparatus in accordance with the present invention will now be described with reference to FIGS. 1–8 of the drawing, illustrating the preferred embodiments thereof. In its preferred embodiments, the subject invention is directed to a spreader apparatus, and in particular, improved metering assemblies for such apparatus including relatively rotatable metering disks for controlling the discharge of granular material from the spreader apparatus. Applicant incorporates by reference herein U.S. Pat. No. 5,029,624, issued Jul. 9, 1991 and entitled "Closed Granular Chemical Handling System" and Australian Patent Application No. 16519/97, published September–October, 1997, as illustrating granular dispensing systems and apparatus including dispensing valves for controlling and metering granular material dispensed from an apparatus.

Turning now to FIG. 1 of the drawing, the metering device generally designated by reference numeral 1 includes a meter disk generally designated by reference numeral 2. A plurality of openings 3, each of which define a predetermined volume, are defined in the meter disk which is rotatably mounted within the metering device. The metering disk is disposed beneath a product container, and material from that container flows downwardly to the meter disk by gravity feed. Relative rotation of the meter disk controls the flow of material through the openings 3. The openings 3 can be of different size and configuration defined around a bolt circle 4 for further controlling the volume and rate of material dispensed from the device through the rotatable meter disk.

The meter disk 2 is secured to a ring gear drive 5, designated by reference numeral 5, by conventional mounting means, as for example flathead screws, designated by reference numeral 6, received in openings in the ring gear drive 5. As more clearly illustrated in FIG. 2, four openings in the ring gear drive are equidistantly spaced apart for firmly and uniformly mounting the meter disk to the ring gear drive.

Figure 1B:
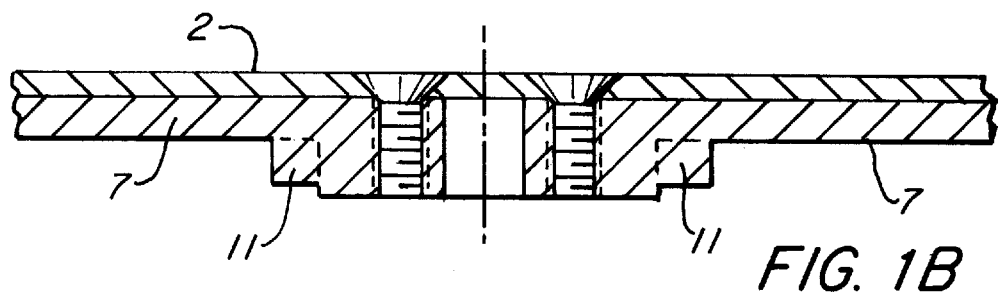
Figure 2:
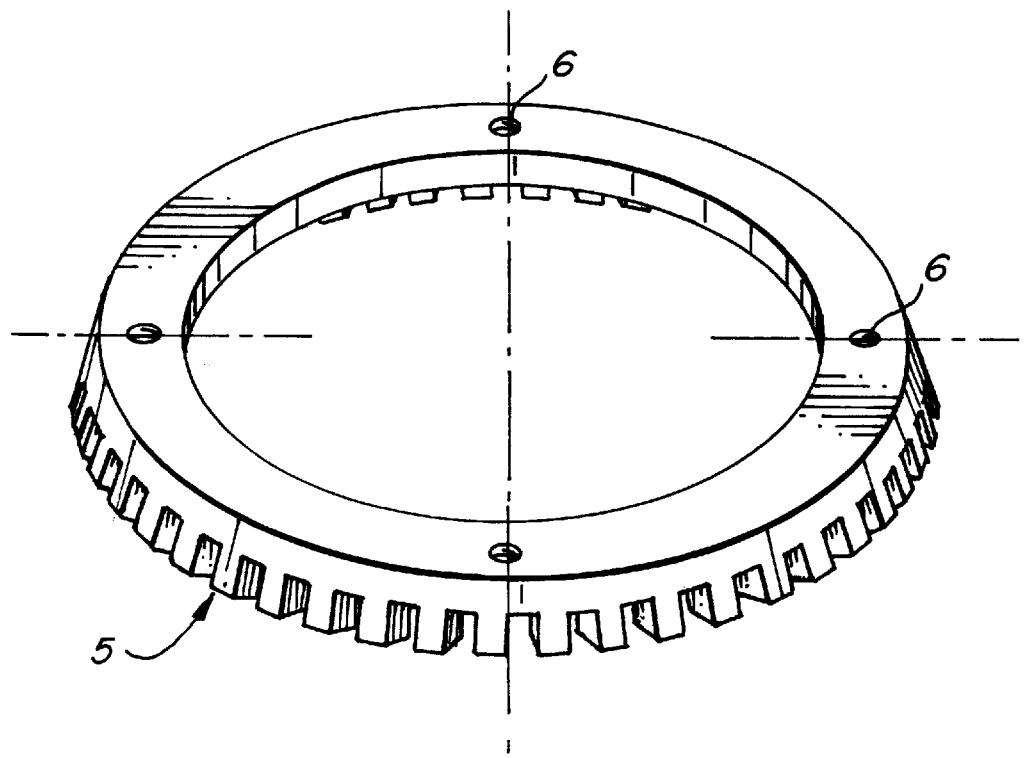
FIG. 2 is a perspective view of a ring gear drive used in the metering in accordance with the present invention.

Still referring to FIG. 1, a thrust plate, generally designated by reference numeral 7, is oriented adjacent to the underside of the meter disk 2. Resilient means, such as a wavy compression spring designated by reference numeral 8 contained in a groove 9 defined in a support block 10 for the meter assembly, exert a force on the thrust plate 7 in a direction towards the underside of the meter disk 2 for supporting the meter disk. Tabs 11 extending from the thrust plate 7 are each received in separate complementary slots 12 defined in the support block 10. Preferably, the tabs 11 have different widths and guide the thrust plate into a predetermined aligned orientation relative to the meter disk, and also prevent the thrust plate from rotating so that it remains in a fixed position relative to the rotatable meter disk supported above the top surface thereof. (See also FIG. 1B).

A meter disk pivot pin, designated by reference numeral 13, is positioned in the support block 10. The pivot pin 13 defines a center axis 14 which extends through the center of a shaft bushing designated by reference numeral 15. A rotatable drive shaft, designated by reference numeral 16, is supported by the shaft bushing 15 which also provides a bearing surface for the rotatable drive shaft. A pair of shaft collars designated by reference numeral 17, located on opposed sides of the shaft bushing 15 in the support block 10, are provided to locate and contain the support block 10 in a predetermined position on the drive shaft 16.

A beveled pinion gear drive 18 is permanently attached to the drive shaft 16. The gear drive 18 is oriented to mesh with a beveled ring gear 19 to provide rotational drive to the drive shaft 16. A chain sprocket 20 provides the driving force for rotating the drive shaft 16, and the drive shaft is supported by a mounting block 21 and a shaft bushing 23 at the end of the drive shaft proximate to the chain sprocket 20. As also illustrated by FIG. 1, a mounting block 21, together with a shaft bushing 23, supports the drive shaft at the end thereof remote from the chain sprocket 20. The shaft bushing 23, permanently attached to the mounting block 21, provides a bearing surface for the drive shaft 16 at that location. A pair of shaft collars 41, located at opposed ends of the mounting block 21 at the remote end of the drive shaft 16, locate and contain the mounting block 21 in its predetermined operating position at the remote end of the drive shaft 16.

The mounting blocks 21 are permanently attached to a slide tray 22, and the shaft bushings 23 are permanently affixed to the mounting blocks 21 for providing a bearing surface for the drive shaft, and for positioning the drive shaft in a predetermined operating position within the metering device. A clearance opening 24 defined in the slide tray 22, is oriented in radial alignment relative to the center axis 14 (See also FIGS. 3 and 6A). The clearance opening 24 allows the meter disk 2 to extend through the clearance opening 24 and press against a hardened wear plate 25 which is secured to a container ring 26, as illustrated by FIG. 1. The container ring 26 is mounted to a product dispensing container 27 with a ring flange 28 and flathead screws 39 (See also FIG. 7). A circular arc wiper 29, positioned on the hardened wear plate 25 and matching the container ring 26, is provided to plow away excess product extending out from openings 3 and above the top surface of the meter disk after the openings are filled to volumetric capacity with product, as the top surface of the meter disk 2 rotates beneath the wear plate 25 which is fixedly oriented relative to the rotating meter disk.

During operation of the metering device, product is initially contained in the openings 3 in the meter disk 2 by the hardened wear plate above the top surface of the meter disk and thrust plate 7 adjacent to the lower surface of the meter disk. The meter disk rotates relative to both the wear plate 25 and the thrust plate 7 which are fixedly mounted in the metering device relative to the rotatable metering disk. The thrust plate 7 defines an arcuate slot 42, as best illustrated by FIG. 4 of the drawing. The slot 42 is oriented and arranged to be in alignment with the openings 3 in the meter disk 2 so that as the meter disk rotates relative to the fixed thrust plate 7 mounted adjacent to the lower surface of the meter disk, product drops from the openings 3, by gravity feed, as the openings 3 are moved over the slot 42. As most clearly illustrated by FIG. 3, product dropping through the slot 42 of the thrust plate 7 is received in a discharge chute 30 and flows through a discharge tube 31, from which the product is dispensed from the spreader device incorporating the meter device.

FIG. 1 also illustrates a rubber star wheel, designated by reference numeral 32, mounted to rotate about an axle 33. The wheel 32 includes cone-shaped protrusions 34 having the same pitch as the openings 3 defined in the meter disk 2.

In operation, the protrusions 34 slide into the openings 3, insuring that the openings have been completely emptied of product after the openings have rotated over the slot 42 in the thrust plate 7. In this manner, the openings are maintained clear and free from residual material to assure that the full capacity of product received in each of the openings is discharged each time the openings are rotated over the slot in the thrust plate. This, in turn, assures accurate control over the quantity and discharge rate of material by the metering device.

Figure 6A:
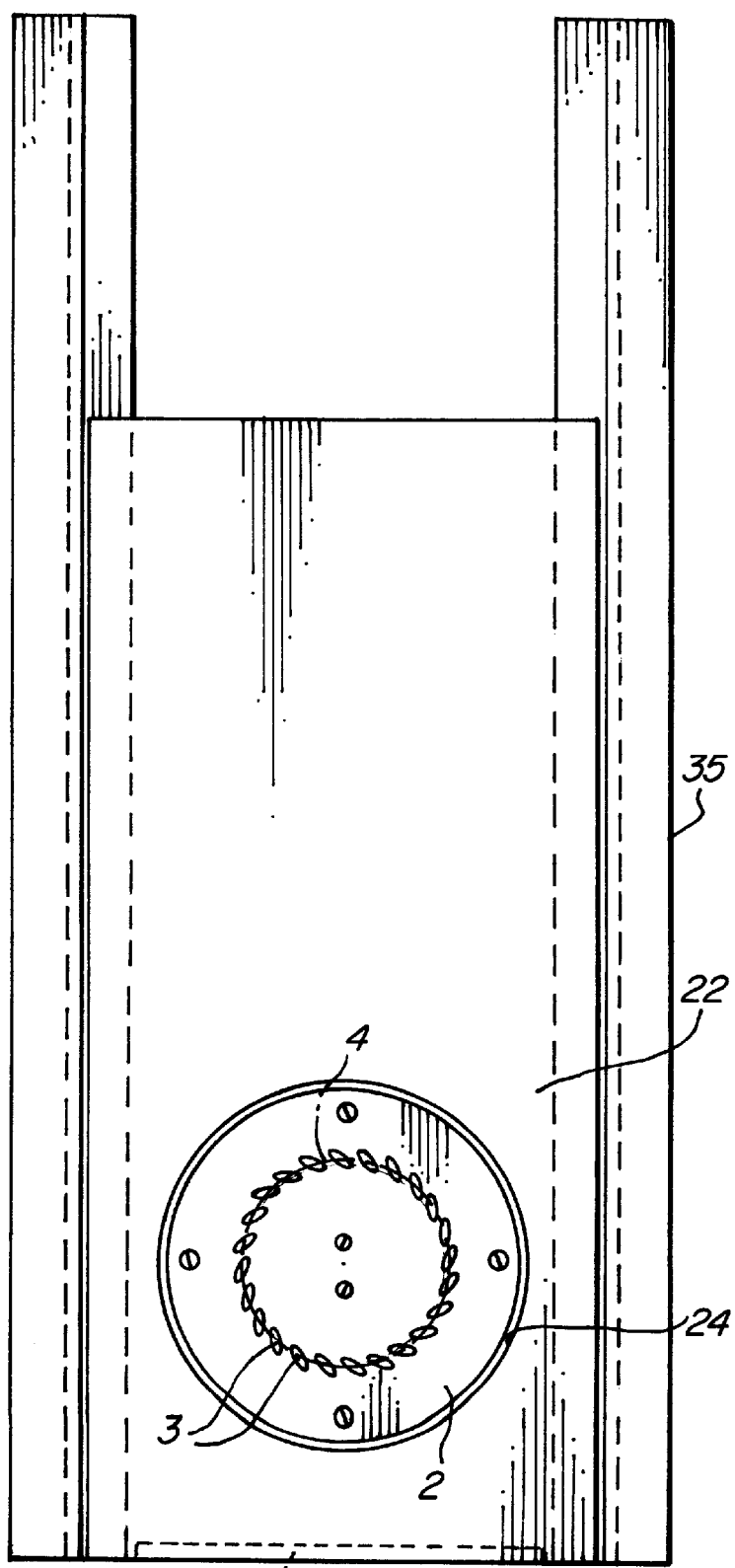
FIG. 6A is a top plan view of a slideable tray carrying a metering disk in accordance with the present invention.
Figure 6B:
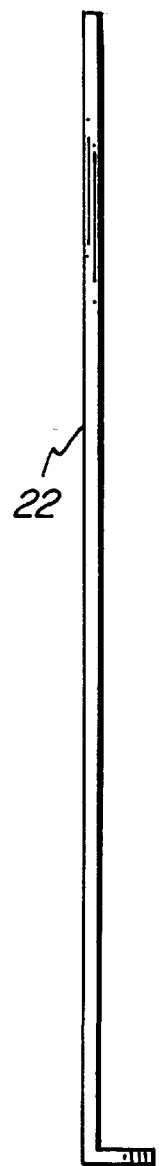
FIG. 6B is a side elevational view of FIG. 6A.
Figure 8:
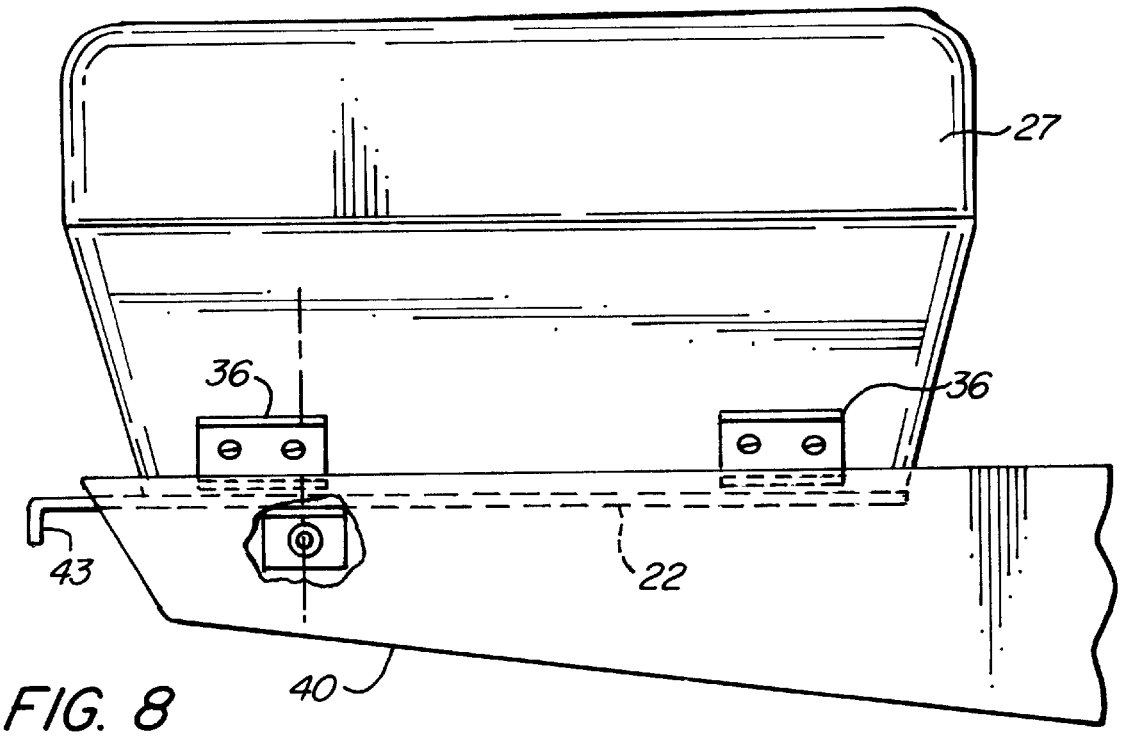
FIG. 8 a side elevational view illustrating a product container mounted to the dispensing apparatus in accordance with the present invention.
Figure 7:
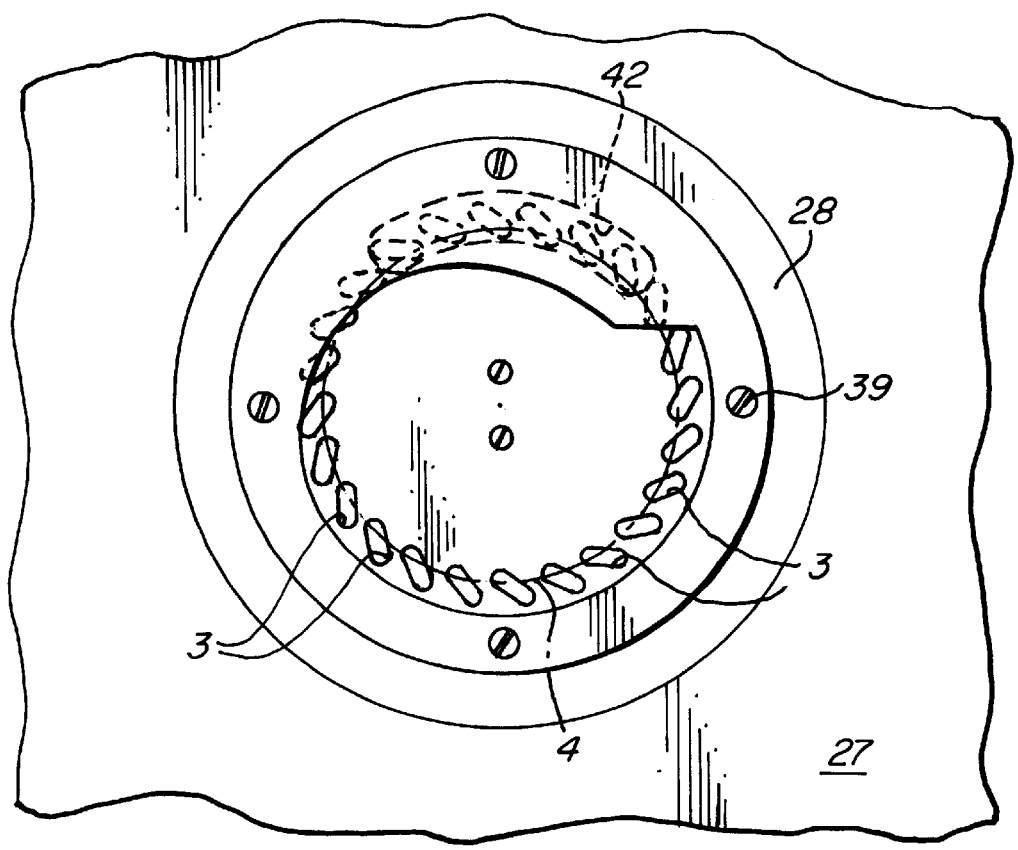
FIG. 7 illustrates, in greater detail, the metering disk mounted to the slideable tray, as illustrated in FIG. 6A.

Referring to FIGS. 1, 3, 6A, 6B, 7, and 8, guide brackets, designated by reference numeral 35, are provided to support the slide tray 22. A tab 43, as best illustrated by FIGS. 3 and 6B, extends from one end of the tray 22. The tab can be integrally formed from the tray by bending one end of the tray at a substantially right angle to the longitudinally extending portion of the tray. The slide tray 22 is displaceable, along the guide bracket 35, relative to the remaining components of the metering device including the support block 10 and the thrust and wear plates 7 and 25 which are fixedly mounted relative to the rotatable metering disk 2. As most clearly shown by FIG. 6A, when the tray 22 is slideably displaced from the meter assembly of the metering device along the supporting bracket means 35, access is provided to the meter disk 2 carried by the tray and displaceable therewith. The metering disk is removably mounted to the tray so that when the tray is slid into its displaced position relative to the meter assembly, the metering disk can be removed from the tray for inspection, maintenance or replacement. In this manner, one metering disk can be replaced with another metering disk having a different orientation of openings 3 or different sized openings 3 to adjust the quantity, flow rate and flow pattern of material metered through the metering disk. When the tray 22 is slid into its displaced position along the guide brackets 35 as illustrated by FIG. 6A, a non-apertured rear portion of the tray is oriented to cover the discharge opening of the product container to prevent product from being discharged from the container by gravity feed when the metering disk is slid into its displaced position. In this position, the closed rear portion of the slide tray acts as a slide gate to cover the product discharge opening 36 of the container ring 26 mounted to the product dispensing container 27.

The metering disk is returned to its retracted operational position by sliding the tray 22 in a direction back into the metering device. The components of the metering device (i.e., the relative arrangement of the guide elements and the tray) are oriented such that when the tray 22 is slid back into its maximum retracted position within the metering device, the metering disk 2, carried by and movable with the slideable tray, is located in its operating position relative to the other components of the metering device and is positioned directly beneath the discharge outlet of the product container. Preferably, stop means are also provided to limit the maximum displacement of the slide tray along the-brackets 35 in a direction out from the meter assembly to prevent complete removal of the tray from the bracket.

Angle brackets 36 are provided for securing the product container 27 to the guide brackets 35. The guide brackets themselves are secured to a portion of the housing for the meter assembly generally designated by reference numeral 38 which extends, at substantially a right angle, from the sidewall 40 of the apparatus (e.g., planter or spreader) carrying the meter assembly.

In accordance with the disclosure of the invention described above, the meter assembly includes means for inspecting and replacing a rotatable metering disk without requiring substantial disassembly of the meter assembly or the overall spreader apparatus.

Turning to FIG. 5 of the drawing, meter disk 2 defines a plurality of oval shaped openings oriented along a circle 4. The forward end of each opening 3 overlaps the trailing end of the next forward opening. Because each opening 3 paritally overlaps the forward end and rear end, respectively, of the two successive adjacent openings, material is continuously metered through the openings 3 as the meter disk 2 rotates in the metering assembly. As discussed herein, the product is metered through the rotatable disk as the openings 3 in the disk pass over the slot 42 defined in the thrust plate 7 positioned beneath the lower surface of the meter disk 2. As a result of the overlapping orientation of the openings 3, at least a portion of one of the openings 3 will always be directly above at least a portion of the slot 42 resulting in continuous flow of product through the openings 3 and the slot 42, by gravity feed, as the meter disk rotates relative to the fixed thrust plate 7. Although FIG. 5 illustrates the openings 3 as being oval in shape, other shaped openings will also provide continuous product flow provided that the openings are oriented and arranged so that a portion of each opening overlaps a portion of each adjacent opening.

Other modifications falling within the scope of the present invention will become apparent to those skilled in the art. Accordingly, the description of the preferred embodiments herein is intended to be illustrative only and not restrictive of the scope of the invention, that scope being defined by the following claims and all equivalents thereto.

What is claimed is:

1. A meter assembly for controlling discharge of material from a spreader apparatus, said meter assembly comprising a rotatable metering element and means for displacing said rotatable metering element between a first predetermined operating position and a second predetermined displaced position for removing said metering element from said means for displacing when said metering element is displaced from said first operating position.

2. A meter assembly for controlling discharge of material from a spreader apparatus, said meter assembly comprising a rotatable metering element and means for displacing said rotatable metering element, wherein said means for displacing includes a slideable element carrying said rotatable metering element, said rotatable metering element being movable with said slideable element.

3. The meter assembly as claimed in claim 2 wherein said slideable element comprises a tray.

4. A meter assembly for controlling discharge of material from a spreader apparatus, said meter assembly comprising a rotatable metering element and means for displacing said rotatable metering element, wherein said rotatable metering element is a disk defining at least one opening therein.

5. The meter assembly as claimed in claim 2 further including guide means operatively associated with said means for displacing said rotatable metering element.

6. A meter assembly for controlling discharge of material from a spreader apparatus, said meter assembly comprising a rotatable metering element and means for displacing said rotatable metering element, said meter assembly further including guide means operatively associated with said means for displacing said rotatable metering element, wherein said guide means comprises at least a portion of a channel adapted to receive said means for displacing said rotatable metering element for movement thereof along said channel.

7. A meter assembly for controlling discharge of material from a spreader apparatus, said meter assembly comprising a rotatable metering element and means for displacing said rotatable metering element, said meter assembly further including guide means operatively associated with said means for displacing said rotatable metering element, said meter assembly further including stop means operatively associated with said guide means for limiting maximum displacement of said means for displacing relative to said meter assembly.

8. A meter assembly for controlling discharge of material from a spreader apparatus, said meter assembly comprising a rotatable metering element and means for displacing said rotatable metering element, wherein said rotatable metering element and said means for displacing said rotatable metering element are oriented relative to said meter assembly such that said rotatable metering element is in a predetermined operating position in said meter assembly when said means for displacing is in a maximum retracted position within said meter assembly.

9. The meter assembly as claimed in claim 2 wherein said slideable element is oriented relative to said meter assembly such that when said slideable element is displaced from said meter assembly, a closed portion of said slideable element is positioned over a discharge outlet of product supply means for preventing the discharge of product therefrom when said slideable element is displaced from said meter assembly.

10. The meter assembly as claimed in claim 2 wherein said slideable element comprises a tab element, said tab element comprising means for sliding said slideable element relative to said meter assembly.

11. A meter assembly for metering products in a spreader apparatus, said meter assembly comprising a rotatable metering disk having first and second surfaces, and a first plate having third and fourth surfaces mounted in a supporting block and oriented relative to said metering element such that said third surface of said first plate is adjacent to the second surface of said metering disk; and means for applying a force to said first plate for maintaining the third surface of said first plate in a contiguously abutting relationship with the second surface of said rotatable metering disk.

12. The meter assembly as claimed in claim 11 wherein said means for applying a force comprises resilient means.

13. The meter assembly as claimed in claim 12 wherein said resilient means comprises at least one resilient element received in a groove defined in said supporting block, said groove and said resilient element being oriented relative to said first plate for exerting a resilient force on said first plate in a direction towards said rotatable metering disk.

14. The meter assembly as claimed in claim 11 wherein said rotatable metering disk defines at least one opening therein, and said first plate defines at least one opening therein in alignment with said one opening in said rotatable metering disk as said rotatable metering disk rotates relative to said first plate.

15. The meter assembly as claimed in claim 11 comprising a second plate having fifth surface and a sixth surface, said second plate being oriented relative to said rotatable metering disk such that said first surface of said rotatable metering disk is adjacent to said sixth surface of said second plate.

16. The meter assembly as claimed in claim 15 further including a wiper element carried by said second plate and oriented to remove product extending above said first surface of said metering disk as said metering disk rotates relative to said second plate.

17. The meter assembly as claimed in claim 11 wherein said rotatable metering a disk defines at least one opening therein, and means insertable into said at least one opening for removing product therefrom.

18. A metering element for controlling the flow of product, said metering element defining a plurality of openings therein, said plurality of openings being oriented such that each of said openings at least partially overlaps each of said openings adjacent thereto to provide continuous flow of product through said metering element as said metering element rotates.

19. The metering element as claimed in claim 18 wherein said plurality of openings are oval shaped.

20. The metering element as claimed in claim 19 wherein said metering element comprises a disk, and said plurality of oval shaped openings are arranged in a circular pattern and oriented in radial alignment on said disk.

* * * * *